United States Patent
Barsness et al.

(10) Patent No.: US 8,027,972 B2
(45) Date of Patent: Sep. 27, 2011

(54) NODAL DATA NORMALIZATION

(75) Inventors: Eric Lawrence Barsness, Pine Island, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 11/861,388

(22) Filed: Sep. 26, 2007

(65) Prior Publication Data

US 2009/0083277 A1 Mar. 26, 2009

(51) Int. Cl.
*G06F 17/30* (2006.01)
(52) U.S. Cl. .......................................... 707/721; 712/28
(58) Field of Classification Search .................. 707/100, 707/764, E17.035, 721; 712/28
See application file for complete search history.

(56) References Cited

U.S. PATENT DOCUMENTS

| | | | | |
|---|---|---|---|---|
| 6,006,232 A | * | 12/1999 | Lyons | 707/101 |
| 6,049,861 A | * | 4/2000 | Bird et al. | 712/28 |
| 2002/0143754 A1 | * | 10/2002 | Paulley et al. | 707/3 |
| 2003/0105811 A1 | * | 6/2003 | Laborde et al. | 709/203 |
| 2004/0003272 A1 | * | 1/2004 | Bantz et al. | 713/193 |
| 2007/0033158 A1 | * | 2/2007 | Gopalan | 707/1 |

\* cited by examiner

*Primary Examiner* — James Trujillo
*Assistant Examiner* — Amresh Singh
(74) *Attorney, Agent, or Firm* — Patterson & Sheridan LLP

(57) ABSTRACT

Embodiments of the invention may be used to normalize data stored in an in-memory database on a parallel computer system. The data normalization may be used to achieve memory savings, thereby reducing the number of compute nodes required to store an in-memory database. Thus, as a result, faster response times may be achieved when querying the data. In one embodiment, normalization may be performed in a manner to avoid datasets that cross physical or logical boundaries of the compute nodes of a parallel system.

24 Claims, 11 Drawing Sheets

| DATA-SET | COL | RATIO | JOINED DATASET | JOINED COL | ACCESS FREQUENCY | SIZE |
|---|---|---|---|---|---|---|
| 420 | 422 | .4 | 440 | 446 | HIGH | 16 |
| 420 | 424 | .9 | ---- | ---- | LOW | 20 |
| 420 | 426 | .1 | ---- | ---- | LOW | 12 |
| 440 | 442 | .8 | ---- | ---- | HIGH | 30 |
| 440 | 444 | .2 | ---- | ---- | MED | 4 |
| 440 | 446 | .7 | 420 | 422 | MED | 16 |

NODAL DATA NORMALIZATION

BACKGROUND OF THE INVENTION

1. Field of the Invention

The present invention generally relates to parallel computing. More specifically, the present invention relates to normalizing databases across compute nodes on a parallel computing system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Gene®. The Blue Gene®/L architecture provides a scalable, parallel computer that may be configured with a maximum of 65,536 (216) compute nodes. Each compute node includes a single application specific integrated circuit (ASIC) with 2 CPU's and memory. The Blue Gene®/L architecture has been successful and on Oct. 27, 2005, IBM announced that a Blue Gene®/L system had reached an operational speed of 280.6 teraflops (280.6 trillion floating-point operations per second), making it the fastest computer in the world at that time. Further, as of June 2005, Blue Gene®/L installations at various sites worldwide were among five out of the ten top most powerful computers in the world.

IBM is currently developing a successor to the Blue Gene®/L system, named Blue Gene®/P. Blue Gene®/P is expected to be the first computer system to operate at a sustained 1 petaflops (1 quadrillion floating-point operations per second). Like the Blue Gene®/L system, the Blue Gene®/P system is scalable allowing for configurations to include different number of racks.

In addition to the Blue Gene® architecture developed by IBM, other highly parallel computer systems have been (and are being) developed. For example, a Beowulf cluster may be built from a collection of commodity off-the-shelf personal computers. In a Beowulf cluster, individual systems are connected using local area network technology (e.g., Ethernet) and system software is used to execute programs written for parallel processing on the cluster of individual systems. Another approach to parallel computing includes large distributed or grid-type computing systems which pool the computing power of many individual systems spread out at a data center.

SUMMARY OF THE INVENTION

The present invention generally provides a method of normalizing a database across a plurality of compute nodes on a parallel computing system. One embodiment of the invention includes a method for distributing a database across a plurality of compute nodes on a parallel computing system. The method generally includes identifying a schema of the database, where the schema specifies a plurality of datasets of the database and relationships among the plurality of datasets. The method may further include evaluating each of the plurality of datasets to identify one or more columns to normalize, normalizing the one or more columns, updating the database schema to reflect the normalization, and distributing the plurality of datasets across the plurality of compute nodes.

Another embodiment of the invention includes a computer-readable storage medium containing a program which, when executed, performs an operation. The operation may generally include identifying a schema of the database, where the schema specifies a plurality of datasets of the database and relationships among the plurality of datasets. The operation may further include evaluating each of the plurality of datasets to identify one or more columns to normalize, normalizing the one or more columns, updating the database schema to reflect the normalization, and distributing the plurality of datasets across the plurality of compute nodes.

Still another embodiment of the invention includes a parallel computing system. The parallel computing system may generally include a plurality of compute nodes, each having at least a processor and a memory and also include a control sub-system configured to normalize an in-memory database across the plurality of compute nodes on the parallel computing system. The control sub-system may generally be configured to perform a step of identifying a schema of the database, where the schema specifies a plurality of datasets of the database and relationships among the plurality of datasets. The control sub-system may generally be further configured to perform the steps of evaluating each of the plurality of datasets to identify one or more columns to normalize, normalizing the one or more columns, updating the database schema to reflect the normalization, and distributing the plurality of datasets across the plurality of compute nodes.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
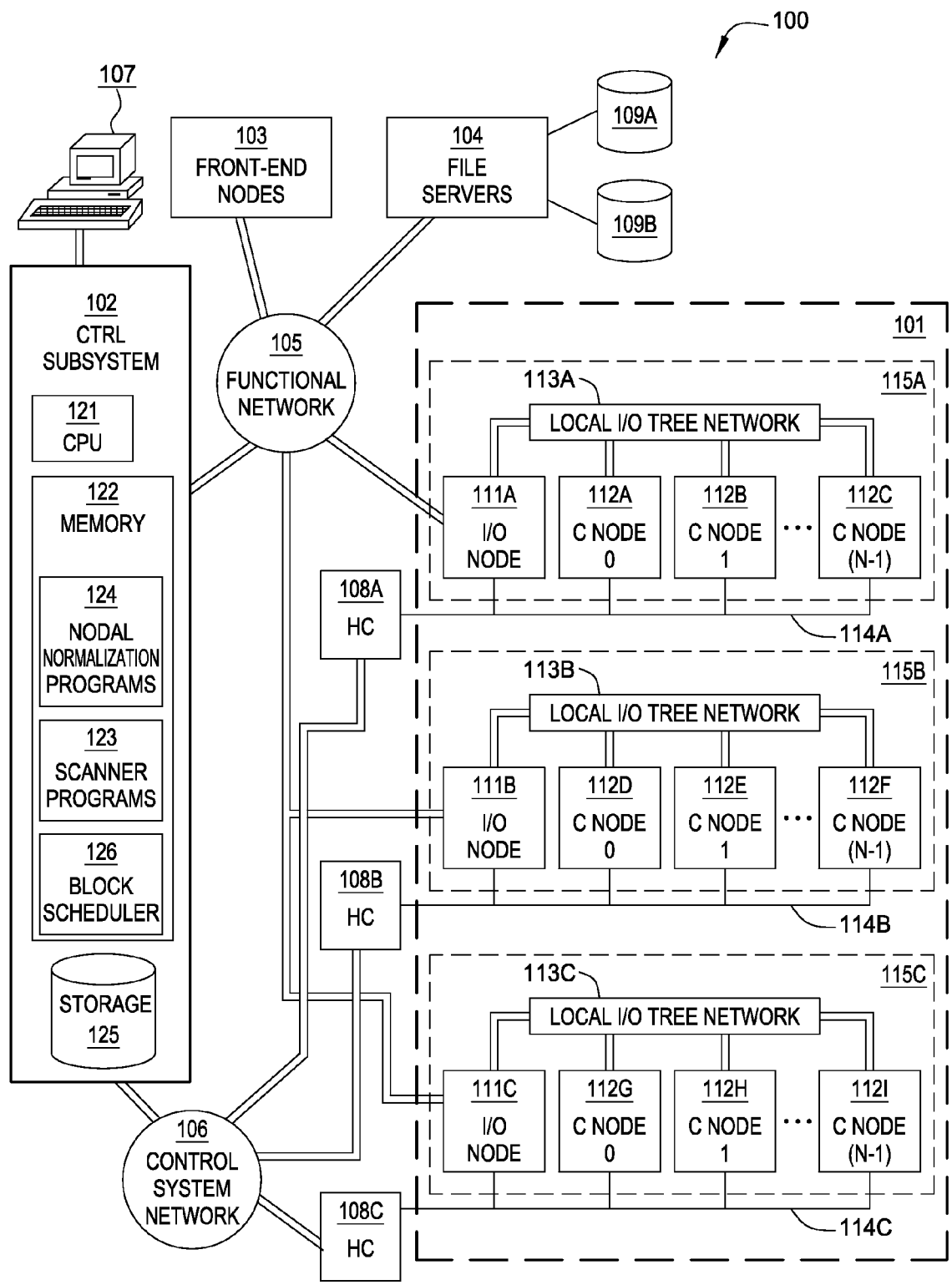
FIG. 1 is a high-level block diagram of components of a parallel computer system, according to one embodiment of the present invention.

Embodiments of the invention may be used to normalize data stored in an in-memory database on a parallel computer system. The data normalization may be used to achieve memory savings, thereby reducing the number of compute nodes required to store an in-memory database. Thus, as a result, faster response times may be achieved when querying the data. In one embodiment, the logical partitioning of a parallel system is used to select to data normalize in order to reduce storage requirements. In such a case, normalization may be performed in a manner to avoid crossing physical or logical boundaries of the compute nodes of a parallel system. For example, an in-memory database may span a group of compute nodes, or mid-plane architectures of a given parallel system. Given that the cost of data retrieval increases respectively across nodes and mid-planes in parallel systems, significant resources may be saved by normalizing datasets to minimize the number of nodes and node groups spanned by a given in-memory database.

In one embodiment, database constraints, referential integrity requirements, and database metadata may be used to determine database columns that may be normalized together. For example, assume a compute node stores two tables in memory and that both tables apply the same constraint to a given field in the table with a similar definition. In such a case, the data in the field may be normalized into to yet a third table, reducing storage space by removing any duplicated values in the first and second tables. Similarly, runtime performance and frequency of queries may be monitored and used as input to the normalization process. For example if all queries against a given column use an UPPER(column) function on the data, then all the data in the in-memory database may be uppercased and the UPPER( ) function no longer needs to be performed at runtime. In some cases, the normalization of data may be done on a node boundary. Meaning normalized tables may be created for data that resides on a given compute node. Therefore, each compute node may perform computing tasks independently of one another and the space savings in such a case may be optimal for a given node.

After an in-memory database is loaded into the memory of the compute nodes of a parallel system, programs may be configured to scan the nodes to identify places where normalization can occur. These programs may be configured to keep track of what normalization has been done and measure query performance. This information may be stored such that future memory loads of the in-memory database from permanent storage may be performed in the most efficient manner. Likewise, the scanning process of the nodes may be ongoing to understand how the data is changing, and an end-user may be allowed to override normalization decisions made by the system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is a computer that includes a processor (or processors) 121, internal memory 122 local storage 125, and block scheduler 126. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 112, and perform diagnostic and maintenance functions. Block scheduler 126 may be configured to assign compute nodes 112 of compute core 101 to a block used to carry out a given user request or job. The database on local storage 125 may be used to record which computing resources (e.g., compute nodes 112) of the parallel system are allocated to a given block and which computing resources are available to perform computing tasks.

As shown, control subsystem 102 also includes scanner programs 123 and nodal normalization programs 124. Scanner programs 123 may be configured to collect performance statistics regarding database access across compute nodes 112. The scanner programs 123 may store the performance statistics in memory 122. Normalization programs 124 may be configured to evaluate a database schema to identify normalizations that may be performed to improve the distribution of data across compute nodes 112. For example, normalization programs 124 may evaluate database constraints, referential integrity requirements, and database metadata to determine database columns that may be normalized together in a manner to localize a table (or other database structure) to a given compute node, or related nodes (e.g., a Pset). Similarly, normalization programs 124 may be configured to evaluate and perform data type or formatting conversions to improve query performance of the in-memory database at runtime. Normalization programs 124 may be further configured to evaluate the performance statistics regarding database performance to evaluate the effectiveness of a given normalization, and adjust the normalization of an in-memory database as necessary.

In one embodiment, a request to perform a computing task may also specify a block size to use in carrying out the task. That is, the user may request the size of a block on which a submitted job should be executed. Further, in some cases the user may request specific compute nodes 112 of parallel system 100. This may be useful where different compute nodes have access to different resources. For example, in a distributed or grid-type system, computing resources available to one block of compute nodes may be dissimilar to others. Thus, if a job requires access to resources that are available at a particular location of a grid, then the job may request access to that location. Similarly, where multiple users may rent (or otherwise share) computing time on a parallel system (e.g., system 100), the size of a block may depend on which (or how many) compute nodes 112 a given user is authorized to access. Alternatively, a job may specify that a job should be run on a block of a particular size, without regard to any particular location on the parallel system. This may be useful when running jobs on a large cluster or parallel system such as a Blue Gene® system, where the compute nodes are relatively homogenous.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
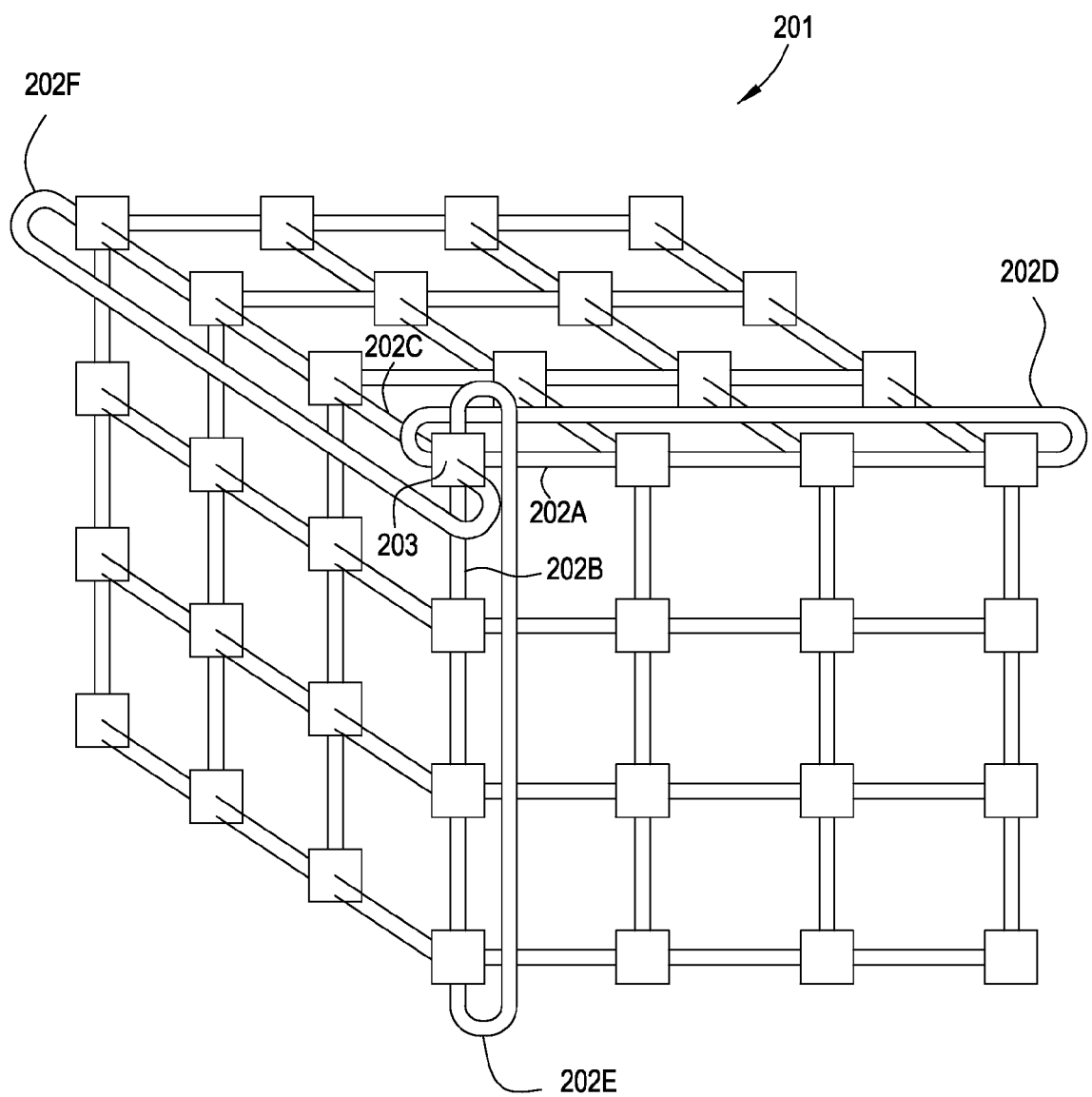
FIG. 2 is a conceptual illustration of a three-dimensional torus network of the system of FIG. 1, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 contiguous nodes, it will be understood that the actual number of compute nodes in a parallel computing system is typically much larger. For example, a complete Blue Gene®/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions. Torus 201 is also representative of a block formed from 64 contiguous compute nodes. That is, torus 201 may be a subset of compute nodes from compute core 101 used to form a block and to execute a particular computing task.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from a last node in the x, y and z dimensions to a first node. Thus, although node 203 appears to be at a "corner" of the torus, node-to-node links 202A-F link node 203 to nodes 202D, 202E, and 202F, in the x, y, and Z dimensions of torus 201.

Figure 3:
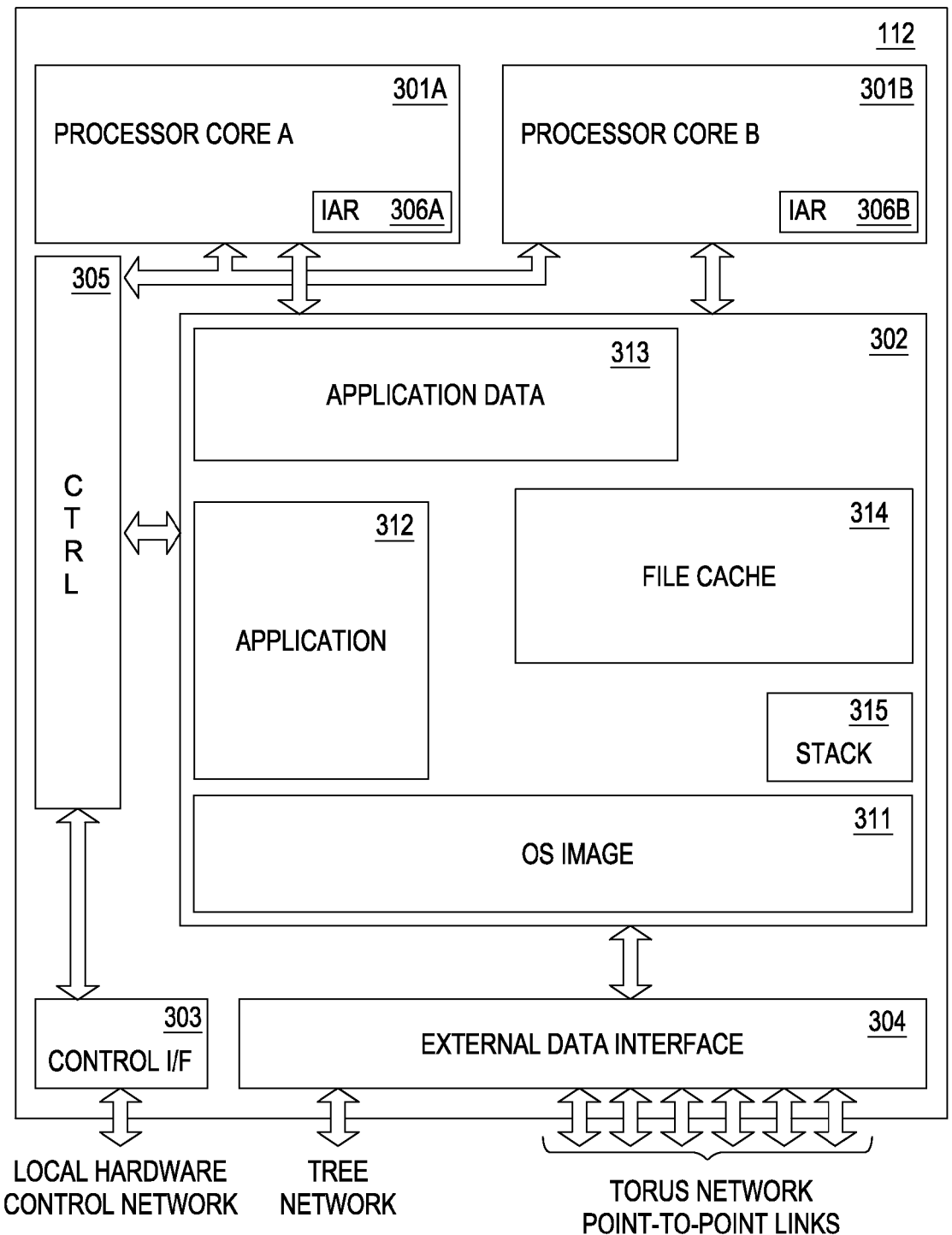
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a Blue Gene® system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries).

Application code image 312 represents a copy of the application code being executed by compute node 112. Application code image 312 may include a copy of a computer program and data submitted for execution on system 100. In one embodiment, a group of compute nodes may be assigned to a block, where each node in the block executes the same application code image 312. The application image on each node may be configured to communicate with the other nodes of that block in performing the computing job. For example, many computing tasks may be performed in parallel, and each node of the block participates in performing a collective task. Using parallel processing techniques to run on a block of hundreds, thousands, or even tens of thousands of compute nodes allows otherwise intractable computing tasks to be performed. Memory 302 may also include a call-return stack 315 for storing the states of procedures which must be returned to, which is shown separate from application code image 312, although in may be considered part of application code state data.

As part of executing a job, application 312 may be configured to transmit messages from compute node 112 to other compute nodes assigned to a given block. For example, the high level MPI call of MPI_Send( ); may be used by application 312 to transmit a message from one compute node to another. On the other side of the communication, the receiving node may call use the MPI call MPI_Receive( ); to receive and process the message. As described above, in a Blue Gene® system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a using a high-speed Ethernet style network. Similarly, large distributed or grid-type systems use message passing techniques to coordinate the processing activity of a block of compute nodes.

As stated, embodiments of the invention may be used to distribute the content of a database across a plurality of compute nodes provided as part of a parallel computing system, forming an in-memory database. Because parallel computing systems include an extremely large number of nodes, a large in-memory database may be stored in such a system. Further, the processing speed of a parallel architecture, in combination with the data access times for an in-memory database provides a very fast computing environment for database applications.

However, because the parallel system distributes an in-memory database across many nodes, the parallel system needs to determine what node every portion of the database is distributed to. In one embodiment, nodal data normalization techniques may be used to optimize just such a distribution. Normalizing data within individual datasets reduces the amount of memory that the in-memory database occupies. By reducing the total amount of memory occupied by the in-memory database, fewer compute nodes are required to store the database. Additionally, the memory saving may allow datasets that would otherwise span nodal boundaries to be stored by a single compute node. Accordingly, overhead required for cross-node data access may be reduced or avoided all together.

Further, reducing the number of data accesses that require communications across nodal boundaries may be accomplished by normalizing data across multiple datasets. In cases where a job executes individual queries against multiple datasets, and where those datasets reside across nodal boundaries, nodal data normalization may allow such datasets to be stored in a single compute node. Of course, in some cases a dataset may exceed the storage capacity of a compute node. Nevertheless, even where data may not be normalized to fit within a single node, normalization may be used to reduce the size of a large dataset (or multiple datasets) to fit within other physical or logical boundaries of a parallel system. For example, two or more datasets with similar column definitions could be too large to reside on one node, even when normalized. However, by normalizing one or more columns across the datasets, the reduction in size may allow all the datasets to fit within two adjacent nodes, nodes sharing accesses to common I/O resources, or within a logical boundary such as a Pset or a mid-plane.

Figure 4A:
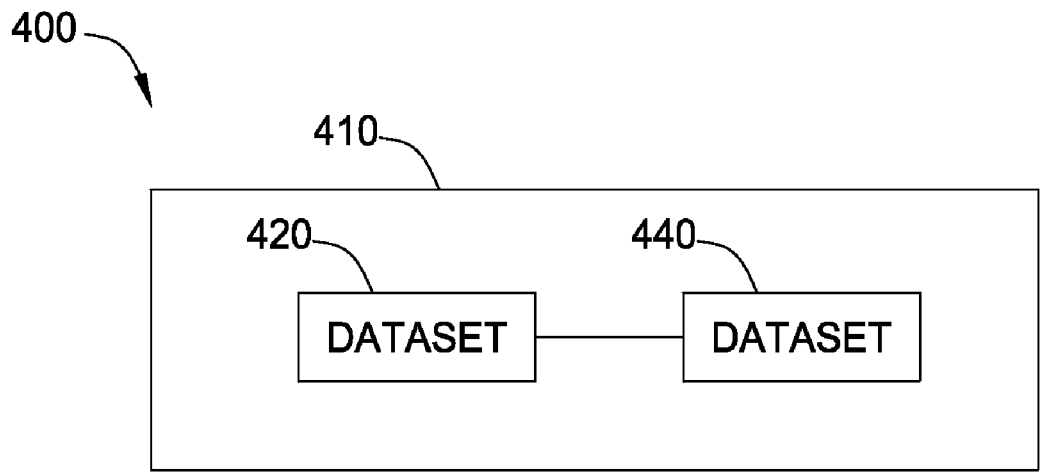
FIGS. 4A-4B illustrate a schema of a database, according to one embodiment of the invention.
Figure 4B:
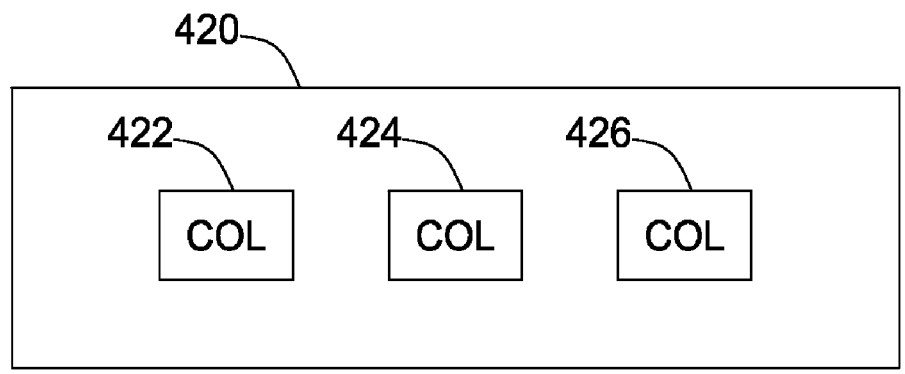
Figure 4B:
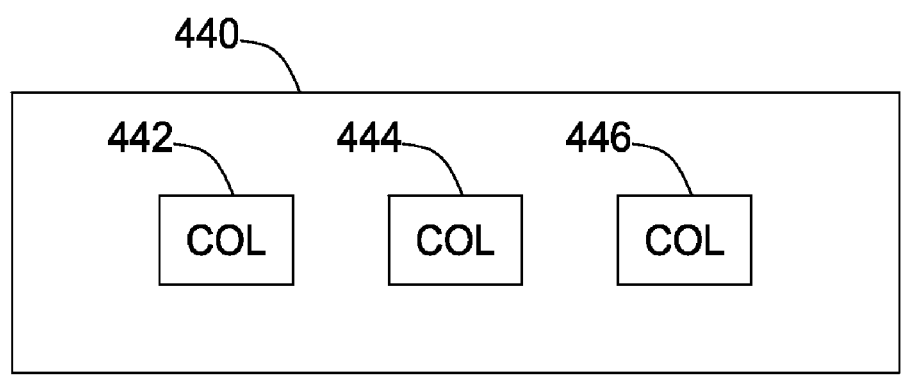

FIG. 4A illustrates an example schema 400 of database 410, according to one embodiment of the invention. For this example, assume that schema 400 illustrates a database schema before nodal data normalization. As shown, database 410 includes datasets 420 and 440, with a relationship associating datasets 420 and 440, e.g., a primary key/foreign key relationship. Examples of datasets include tables, columns, or files, and a schema provides an organization of such tables, columns, or rows. Typically, databases consist of more than two datasets. However, in the interest of clarity, only two datasets are shown here. FIG. 4B illustrates a columnar organization of datasets 420 and 440. As shown, datasets 420 and 440 include columns 422, 424, and 426, and columns 442, 444, and 446, respectively. Columns 422-426, and 442-446 represent the rows of data within one column of datasets 420 and 440 respectively.

Figure 5:
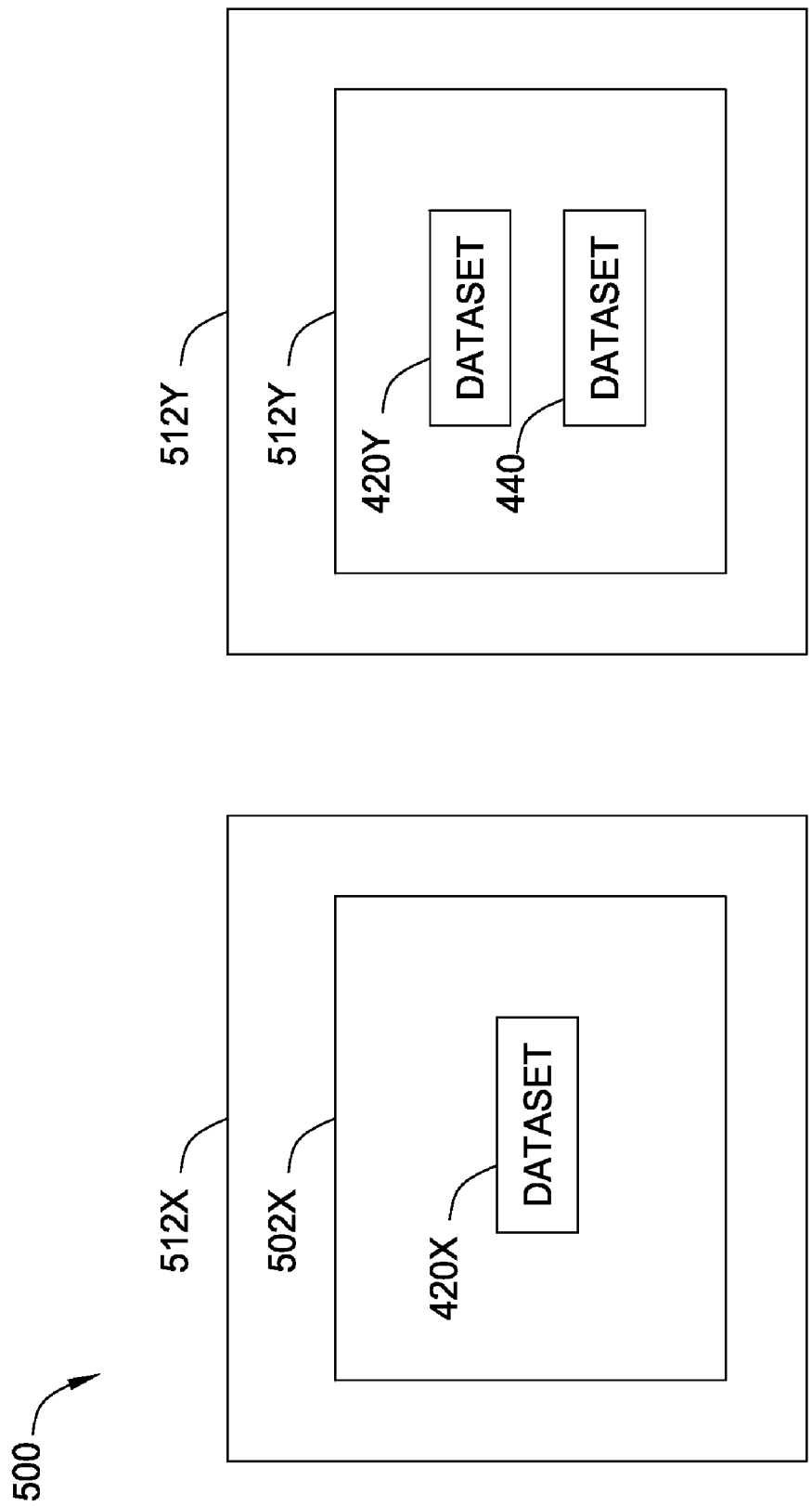
FIG. 5 provides a conceptual illustration of an in-memory distribution of database on a parallel computer system, according to one embodiment of the invention.

FIG. 5 provides a conceptual illustration of an in-memory distribution of database 410 on a parallel computer system, according to one embodiment of the invention. For this example, assume FIG. 5 illustrates database distribution of database 410 before nodal data normalization. As shown, FIG. 5 includes compute nodes 512X, 512Y and memories 502X, 502Y. Memories 502X and 502Y reside within compute nodes 512X and 512Y, respectively. Also as shown, dataset 420 (represented as 420X and 420Y) spans memories 502X and 502Y. Because dataset 420 spans a nodal boundary, data accesses against dataset 420 may incur additional processing costs for data communications between nodes 512X and 512Y. Dataset 440, however, resides solely within memory 502Y, providing the advantage of intra-nodal data access, which is more efficient than cross-nodal data access.

Figure 6:
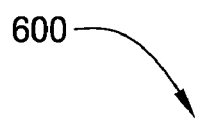
FIG. 6 is a block diagram illustrating rows in a dataset profile, according to one embodiment of the invention.

FIG. 6 is a block diagram illustrating a dataset profile 600, according to one embodiment of the invention. In this example, dataset profile 600 is used to provide metrics for datasets 420 and 440 of database 410. In one embodiment, dataset profile 600 may be used to facilitate the database normalization on a parallel computer system. Illustratively, dataset profile 600 includes six rows, each row representing performance statistics for the columns of datasets 420 and 440 (i.e. one of columns 422-426 and 442-446). Each row contains seven columns: "Dataset," "Column," "Ratio," "Joined Dataset," "Joined Column," "Access Frequency," and "Size." The first row in dataset profile 600 contains the following values: Dataset "420," column "422," Ratio "0.4," Joined Dataset "440," Joined Column "446," Access Frequency "HIGH," and Size "16." Other rows contain similar values. Note, in this example, column 422 of dataset 420 is joined with column 446 of dataset 440, and this relationship is recorded in the first and sixth rows of dataset profile 600.

Together, the "Dataset" and "Column" columns identify a specific column within database 410. Performance statistics may be organized by columns in the profiled dataset to facilitate normalization. When normalizing a dataset, one or more columns are selected from the dataset, moved into a new dataset, and a relationship is established between the new dataset and the old dataset. In one embodiment, the values in each row of the "Ratio" column may represent a ratio of unique values to total values in a given column. For example, assume column 422 contains 100 total values, but only 40 unique values, resulting in a ratio of 0.4 (as shown). Similarly, column 424 may contain the same number of values (100) but include 90 unique values resulting in a ratio of 0.9 (as shown). In one embodiment, the value in the "Ratio" column may contribute to a decision of whether to normalize a column included in a given dataset. In this example, the ratio of 0.4 for column 422 represents a higher repetition of values then the ratio of 0.9 for column 424. Accordingly, because of the greater memory savings, column 422 is a better candidate for normalization than column 424.

In one embodiment, a threshold value may be used to determine whether to normalize a dataset for a particular column based on the actual ratio of unique to total values. Columns with ratios at or below the threshold ratio are normalized; columns with ratios above the threshold are not normalized. The actual threshold value may be set by an administrator as a matter of experience. Suppose the threshold ratio is 0.3, neither column 422 nor 424 would be normalized. According to one embodiment of the invention, another factor used to determine whether to normalize a dataset includes a determination of whether normalizing a given dataset reduces the number of nodes required to store that dataset. An example of nodal data normalization used to reduce the number of nodes required to store a dataset is described in greater detail in the discussion of FIGS. 7 and 8, below.

The columns "Joined Dataset" and "Joined Column" identify related columns in different datasets within database 410. For example, tables in a relational database may be related by a primary key foreign key relationship. Further, data access commands may be used to combine data from related datasets. An SQL JOIN is an example of such a data access command. An SQL JOIN selects rows from at least two datasets. For example, according to dataset profile 600, an SQL JOIN returns result rows only when the value of Column 422 in dataset 420 is equal to the value of Joined Column 446 in Joined Dataset 440.

As discussed above, accessing in-memory data across compute nodes requires more resources than accessing data within a single node. The "Joined Dataset" and "Joined Column" may be used to identify combined datasets that span nodal boundaries. In one embodiment, combined datasets may be normalized when doing so facilitates storing combined datasets within a single node (or group of related nodes). An example of nodal data normalization used to combine datasets determination is described in greater detail in the discussion of FIGS. 9 and 10 below.

Values in the "Access Frequency" column may identify a how frequently data in a particular column is accessed. Illustratively, data in the "Access Frequency" column is recorded with a generic description of "Low," "Medium," or "High." Of course, particular measure of access frequency may be tailored to suit the needs of a particular case. Columns of a dataset with higher levels of access are better candidates for normalization than columns with lower levels of access. If other factors, such as the "Join Columns" value and ratios are equal between two columns for two datasets, and there was only room for one normalized Dataset within a compute node, the value of the "Access Frequency" column could be used as a deciding factor. The value in the "Size" column of dataset profile 600 is a measure of the column size, by character. Size may also be measured using other measures, such the number of bytes required to store the column in the in-memory database.

Figure 7A:
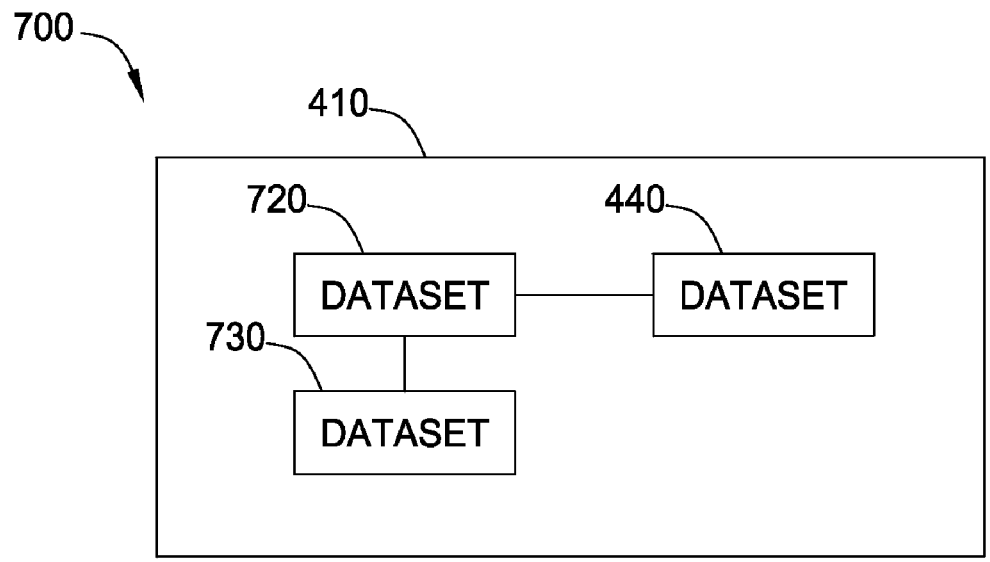
FIGS. 7A-7B illustrate a normalized database schema, according to one embodiment of the invention.
Figure 7B:
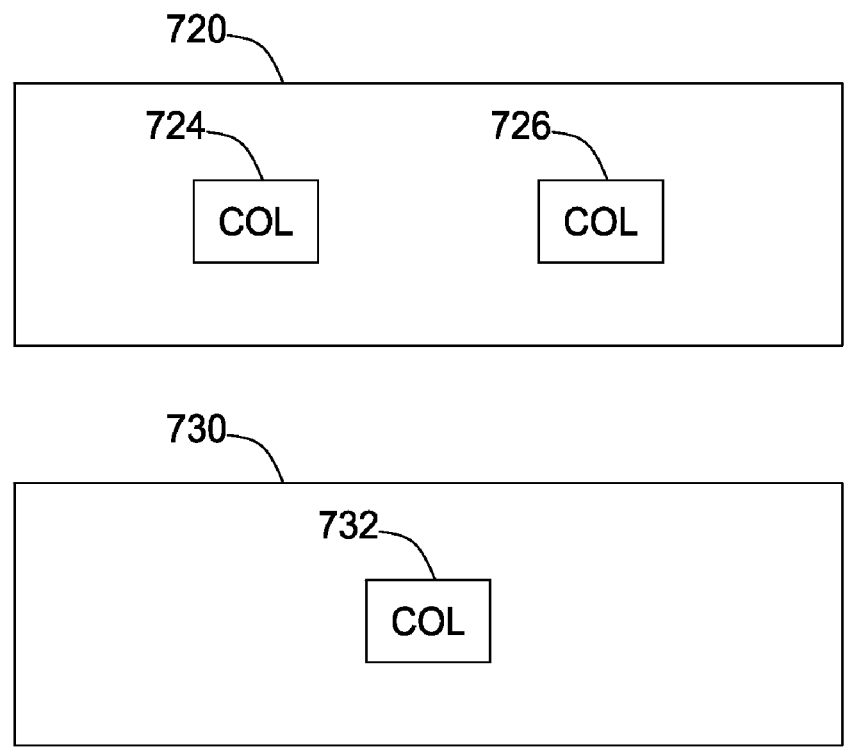

FIG. 7A illustrates a normalized database schema 700, according to one embodiment of the invention. In this example, normalized database schema 700 represents database 410 of FIGS. 4A-4B, after nodal data normalization. As shown, database schema 700 includes datasets 720, 730, and 440. In this example, datasets 720 and 730 correspond to dataset 420 shown in FIG. 4A, after a column of dataset 420 has been normalized out. Specifically, column 422 has been normalized out from dataset 420, creating a normalized dataset 720. Column 422 has been placed in a new dataset 730, and a relationship has been created between dataset 720 and dataset 730. FIG. 7B illustrates a columnar organization of datasets 720 and 730. Note, dataset 440 of figure is unchanged by the normalization being described, and is therefore not represented in FIG. 7B. Dataset 720 includes columns 724 and 726, corresponding to the columns 424 and 426 of dataset 420 in FIG. 4B. Dataset 730 contains column 732 corresponding to column 422 that was normalized from dataset 420. Because this column is normalized, column 732 contains the distinct values of column 422.

Figure 8:
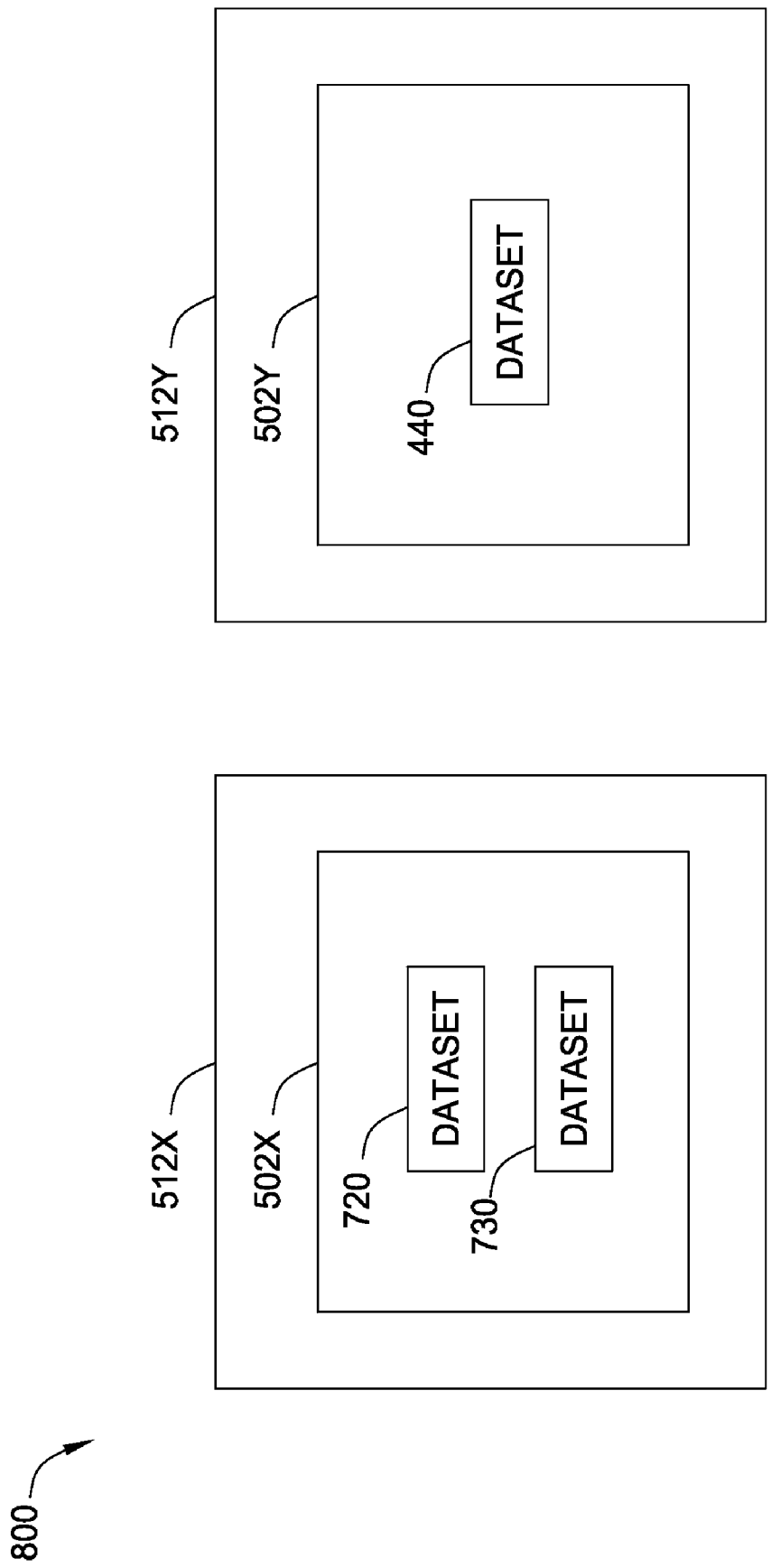
FIG. 8 provides a conceptual illustration of an in-memory distribution of database on a parallel computer system, according to one embodiment of the invention.

FIG. 8 provides a conceptual illustration of an in-memory distribution of database 410 on a parallel computer system, according to one embodiment of the invention. Illustratively, FIG. 8 shows the distribution of database 410 on compute nodes 512X and 512Y after being normalized as shown in schema 700. In an advantage, both datasets 720 and 730 are stored in memory 502X of compute node 512X. Data accesses against datasets 720 and 730 can replace data accesses against old dataset 420, with the advantage that no cross-node data communications are required to access data in datasets 720 and 730 or to evaluate query conditions, as was required for the cross-node distribution of dataset 420 shown in FIG. 5.

Figure 9B:
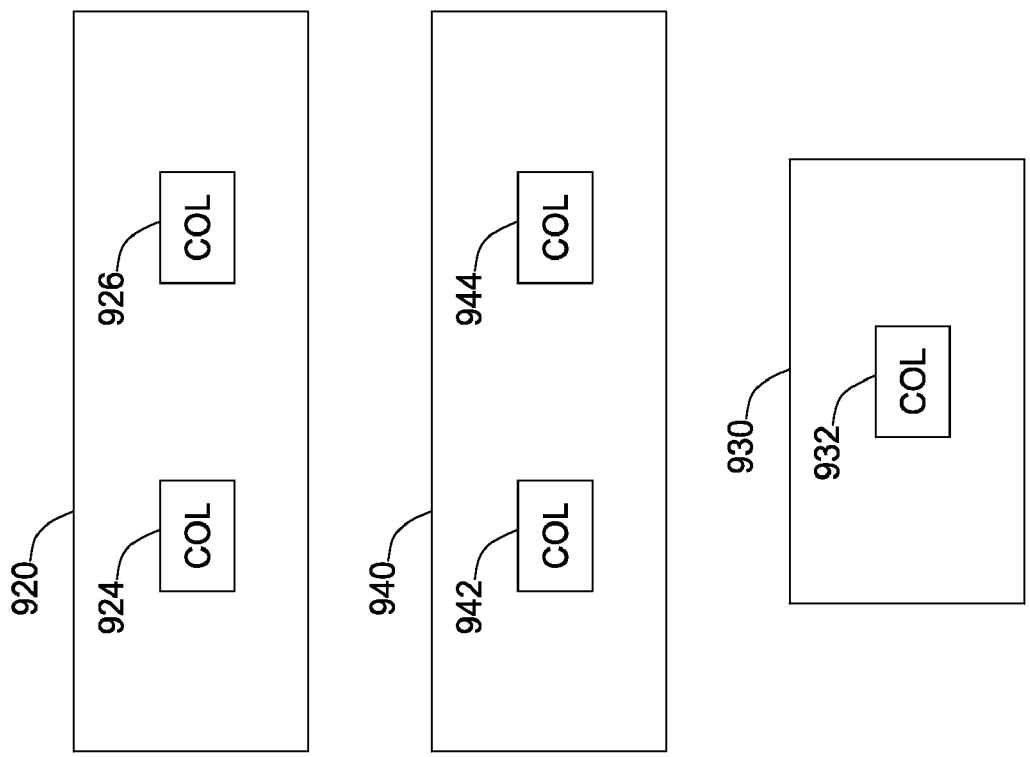
FIGS. 9A-9B illustrate a database schema after nodal data normalization, according to one embodiment of the invention.
Figure 9A:
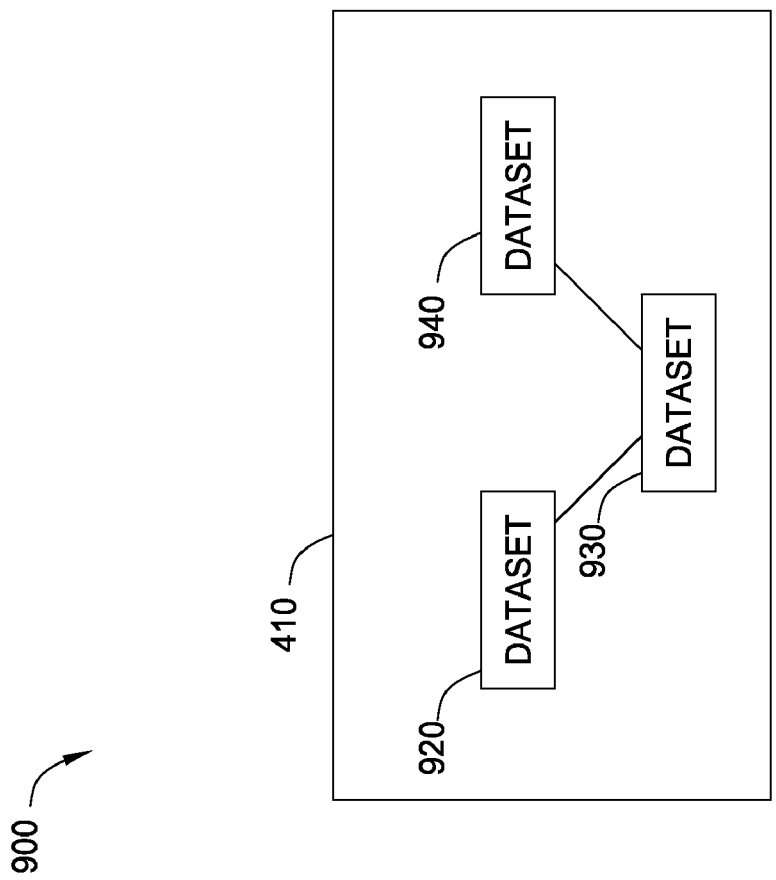
Figure 10:
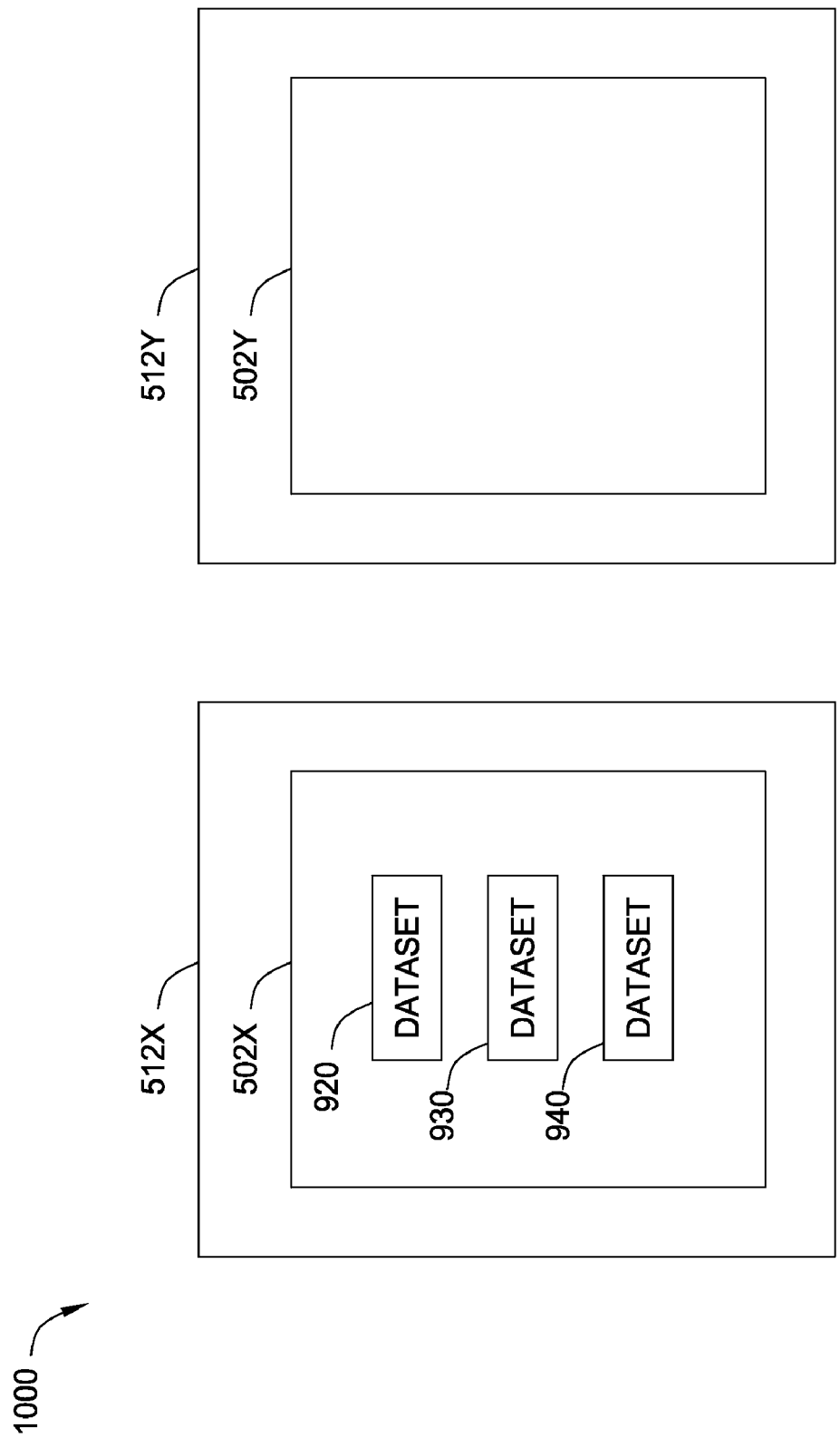
FIG. 10 illustrates an example of a database distributed across the nodes of a parallel computing system, according to one embodiment of the invention.

FIGS. 9A-9B and FIG. 10 further illustrate the use of dataset normalization to improve the distribution of a database across the nodes of a parallel computing system, according to one embodiment of the invention. More specifically, FIG. 9 illustrates a database schema 900 for database 410 (originally organized using schema 400). Recall that the first row in dataset profile 600 stores performance statistics for column 422 of dataset 420. Specifically, column 422 has a Joined Column 446 in dataset 440. Accordingly, datasets 420 and 440 are combined datasets. In one embodiment, nodal normalization programs 124 may determine whether normalizing data from columns 422 and 446, would reduce the memory requirements for these datasets such that the normalized form could be stored in memory 502X of compute node 512X, or within another logical or physical boundary of a parallel computing system. If so, then nodal normalization programs 124 may normalize datasets 420 and 440.

Specifically, in this example, nodal normalization programs 124 may remove column 422 and 446 from datasets 420 and 440 to create normalized datasets 920 and 940, respectively. The removed columns 422 and 446 may be stored in a new dataset 930. The nodal normalization programs 124 may then create a one-to-one relationship between dataset 930 and datasets 940 and a one-to-one relationship between dataset 940 and dataset 930. As shown in FIG. 9, nodal data normalization results in a new schema for database 410. FIG. 9B illustrates the columnar organization of normalized datasets 920, 930 and 940. Dataset 920 contains columns 924 and 926, representing columns 424 and 426 from dataset 420. Dataset 940 contains columns 942 and 944 representing columns 444 and 446 from dataset 440. Dataset 930 stores column 932, representing an integration of columns 422 and 446 removed from dataset 440. In one embodiment, column 932 stores the distinct values of columns 422 and 446, to maximize the memory savings of nodal data normalization.

FIG. 10 provides a conceptual illustration of an in-memory distribution of database 410 on a parallel computer system, according to one embodiment of the invention. Illustratively, FIG. 10 shows the distribution of database 410 on compute nodes 512X and 512Y after being normalized as shown in schema 900. After the normalization process, datasets 920, 930, and 940 are stored solely in memory 502X of compute node 512X.

Advantageously, datasets that would not have otherwise been individually normalized under the determinations described in FIG. 6 and FIG. 7 are normalized such that enough space is freed up in memory 502A to accommodate all the data stored in datasets 420 and 440. Because all the data resides in one compute node, concurrent data accesses, such as an SQL JOIN, across datasets 920, 930, and 940 may be performed by compute node 512X. Further, system resources on the parallel computing system are conserved because of the availability of compute node 512Y.

Figure 11:
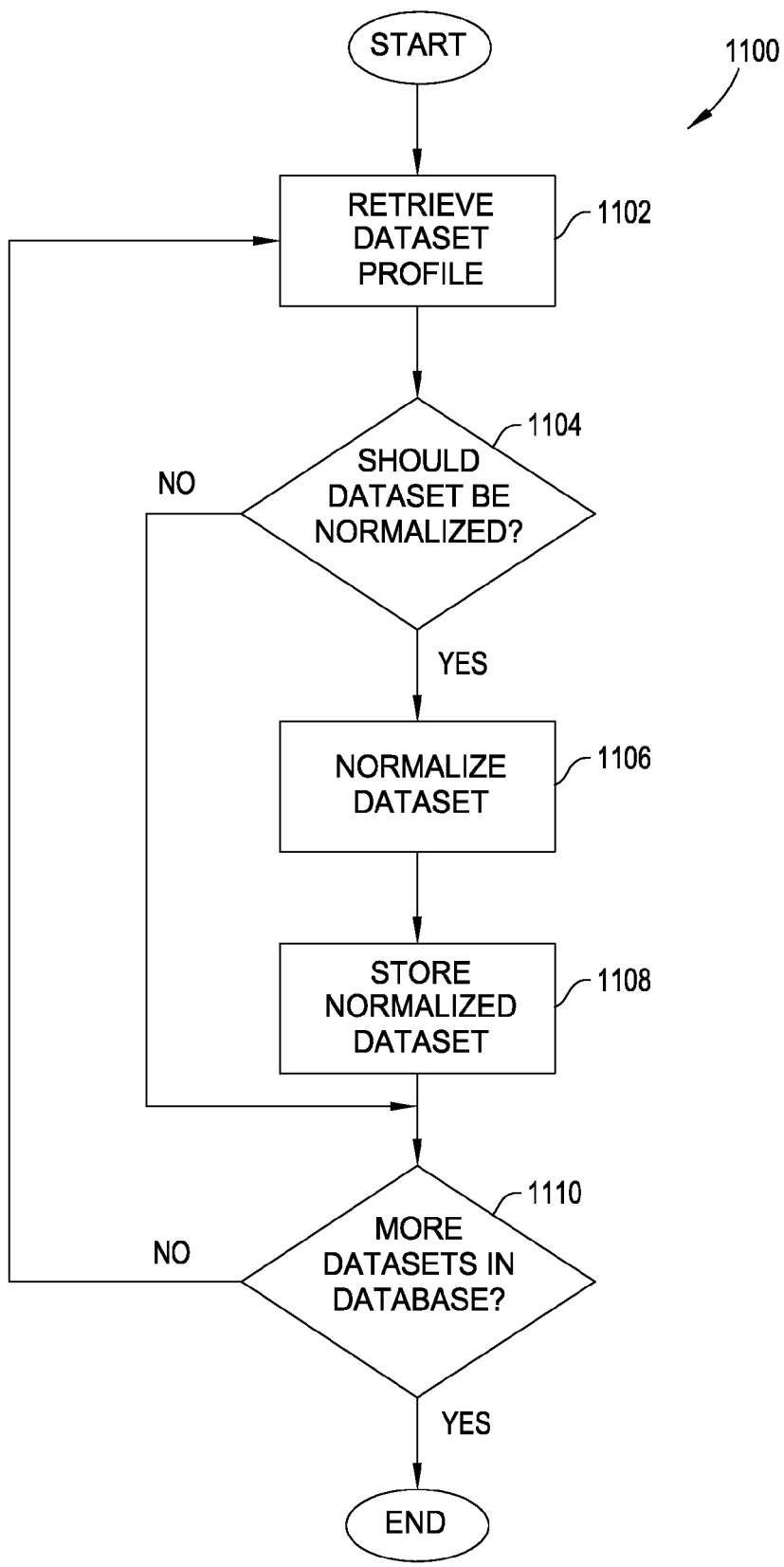
FIG. 11 is a flowchart illustrating a process for normalizing a database in a parallel computer system, according to one embodiment of the invention.

FIG. 11 is a flowchart illustrating a process 1100 for normalizing a database in a parallel computer system, according to one embodiment of the invention. As shown, process 1100 begins at step 1102, where the normalization program 124 may retrieve a record from dataset profile for a given database to be distributed as an in-memory database on the compute nodes of a parallel computer system. In one embodiment, dataset profile stores performance statistics for columns within a database used to evaluate whether to normalize columns of a dataset.

At step 1104, the normalization program 124 determines whether to normalize columns from a dataset, based on the performance statistics for a particular column or based on the size of a given dataset. For example, the normalization program 124 may identify datasets (e.g., a database table) too large to fit within the storage of a single compute nodes (or related group of compute nodes). In such a case, the normalization program 124 may evaluate a dataset profile associated with that dataset to determine whether normalizing the dataset would reduce the size of the dataset to fit within a single node (or related group of nodes). As another example, the normalization program 124 may identify columns of database 420 with a low ratio of distinct values to total values, and normalize such columns. As yet another example, normalization program 124 may identify data type or formatting conversions to improve query performance of the in-memory database at runtime.

If the normalization program 124 decides to normalize portions of a given dataset, then at step 1106 the dataset is normalized. As described, normalization may include removing data from one column in a dataset, creating a new dataset storing the normalized data, and creating a relationship form the old dataset to the new dataset. Further, the new data set may include only the distinct values from the removed data, reducing the storage space (e.g., the memory of a compute node) required to store the normalized data. At step 1108, the dataset is stored within a compute node (or related group of compute nodes) on a parallel computer system, such as the storing of datasets 920, 930, and 940 according to FIGS. 9 and 10. At step 1110, if there are more datasets to evaluate, the next profile is processed according to steps 1102, 1104, 1106, and 1108.

Advantageously, embodiments of the invention may be used to normalize data stored in an in-memory database on a parallel computer system. The data normalization may be used to achieve memory savings, thereby reducing the number of compute nodes required to store an in-memory database. Thus, as a result, faster response times may be achieved when querying the data. In one embodiment, normalization may be performed in a manner to avoid datasets that cross physical or logical boundaries of the compute nodes of a parallel system. For example, an in-memory database may span a group of compute nodes, or mid-plane architectures of a given parallel system. Given that the cost of data retrieval increases when data communication is required across nodes and mid-planes in a parallel system, significant resources are saved by normalizing datasets to minimize the number of nodes and node groups spanned by a given in-memory database.

While the foregoing is directed to embodiments of the present invention, other and further embodiments of the invention may be devised without departing from the basic scope thereof, and the scope thereof is determined by the claims that follow.

What is claimed is:

1. A method comprising:
identifying a schema of an in-memory database, wherein the in-memory database comprises a database that is stored entirely in internal memory, wherein the schema specifies a plurality of datasets of the in-memory database and relationships among the plurality of datasets, wherein the plurality of datasets includes a first dataset spanning a first count of compute nodes on a parallel computing system, the first count being at least two;
determining whether the first dataset is likely to span fewer compute nodes when normalized, based on a dataset profile associated with the first dataset; and
upon determining that the first dataset is likely to span fewer compute nodes when normalized, normalizing the dataset based on the dataset profile, comprising:
evaluating the dataset profile to identify one or more columns to normalize;
normalizing the one or more columns of the in-memory database;
updating the schema of the in-memory database to reflect the normalization; and
storing the first dataset across a second count of compute nodes on the parallel computing system, the second count being less than the first count.

2. The method of claim 1, wherein normalizing the one or more columns comprises normalizing each column in the given dataset where the ratio of distinct values to total values falls below a specified threshold.

3. The method of claim 1, wherein normalizing the one or more columns comprises a data type or a data formatting conversion performed to improve query performance of the in-memory database at runtime.

4. The method of claim 1, wherein normalizing a column from the first dataset comprises creating a new dataset to store each distinct value from the column, removing the column from the first dataset, and creating a database relationship between the created dataset and the first dataset.

5. The method of claim 1, wherein a column is identified to normalize in order to reduce the storage requirements of a given dataset to fit within a logical or physical boundary of the parallel computer system.

6. The method of claim 5, wherein the physical boundary comprises a memory of a single compute node, and wherein the given dataset is identified to be normalized in order to fit within the memory.

7. The method of claim 5, wherein the logical boundary comprises a group of compute nodes sharing access to a common resource, and wherein the given dataset is identified to be normalized in order to fit within the group of compute nodes.

8. The method of claim 1, wherein the dataset profile specifies at least one of: (i) a ratio of distinct values to total values in one or more columns included in the first dataset; (ii) an access frequency of one or more columns included in the first dataset; (iii) a column size of one or more columns included in the first dataset; and (iv) a count of rows included in the first dataset.

9. The method of claim 8, wherein the determination that the first dataset is likely to span fewer compute nodes when normalized, is based on at least two of: (i) the ratio of distinct values to total values in one or more columns included in the first dataset; (ii) the access frequency of one or more columns included in the first dataset; (iii) the column size of one or more columns included in the first dataset; and (iv) the count of rows included in the first dataset.

10. The method of claim 8, wherein the determination that the first dataset is likely to span fewer compute nodes when normalized, is based on at least three of: (i) the ratio of distinct values to total values in one or more columns included in the first dataset; (ii) the access frequency of one or more columns included in the first dataset; (iii) the column size of one or more columns included in the first dataset; and (iv) the count of rows included in the first dataset.

11. A computer-readable storage medium containing a program which, when executed, performs an operation, the operation comprising:
identifying a schema of an in-memory database, wherein the in-memory database comprises a database that is stored entirely in internal memory, wherein the schema specifies a plurality of datasets of the in-memory database and relationships among the plurality of datasets, wherein the plurality of datasets includes a first dataset spanning a first count of compute nodes on a parallel computing system, the first count being at least two;
determining whether the first dataset is likely to span fewer compute nodes when normalized, based on a dataset profile associated with the first dataset; and
upon determining that the first dataset is likely to span fewer compute nodes when normalized, normalizing the dataset based on the dataset profile, comprising:
evaluating the dataset profile to identify one or more columns to normalize;
normalizing the one or more columns of the in-memory database;
updating the schema of the in-memory database to reflect the normalization; and
storing the first dataset across a second count of compute nodes on the parallel computing system, the second count being less than the first count.

12. The computer-readable storage medium of claim 11, wherein normalizing the one or more columns comprises normalizing each column in the given dataset where the ratio of distinct values to total values falls below a specified threshold.

13. The computer-readable storage medium of claim 11, wherein normalizing the one or more columns comprises a data type or a data formatting conversion performed to improve query performance of the in-memory database at runtime.

14. The computer-readable storage medium of claim 11, wherein normalizing a column from the first dataset comprises creating a new dataset to store each distinct value from the column, removing the column from the first dataset, and creating a database relationship between the created dataset and the first dataset.

15. The computer-readable storage medium of claim 11, wherein a column is identified to normalize in order to reduce the storage requirements of a given dataset to fit within a logical or physical boundary of the parallel computer system.

16. The computer-readable storage medium of claim 15, wherein the physical boundary comprises a memory of a single compute node, and wherein the given dataset is identified to be normalized in order to fit within the memory.

17. The computer-readable storage medium of claim 15, wherein the logical boundary comprises a group of compute nodes sharing access to a common resource, and wherein the given dataset is identified to be normalized in order to fit within the group of compute nodes.

18. A parallel computing system, comprising:
a plurality of compute nodes, each having at least a processor and a memory; and
a control sub-system configured to normalize an in-memory database across the plurality of compute nodes on the parallel computing system by performing the steps of:
identifying a schema of the in-memory database, wherein the in-memory database comprises a database that is stored entirely in the memory, wherein the schema specifies a plurality of datasets of the in-memory database and relationships among the plurality of datasets, wherein the plurality of datasets includes a first dataset spanning a first count of the plurality of compute nodes, the first count being at least two;
determining whether the first dataset is likely to span fewer compute nodes when normalized, based on a dataset profile associated with the first dataset; and
upon determining that the first dataset is likely to span fewer compute nodes when normalized, normalizing the dataset based on the dataset profile, comprising:
evaluating the dataset profile to identify one or more columns to normalize;
normalizing the one or more columns of the in-memory database;
updating the database schema of the in-memory database to reflect the normalization; and
storing the first dataset across a second count of the plurality of compute nodes, the second count being less than the first count.

19. The system of claim 18, wherein normalizing the one or more columns comprises normalizing each column in the given dataset where the ratio of distinct values to total values falls below a specified threshold.

20. The system of claim 18, wherein normalizing the one or more columns comprises a data type or a data formatting conversion performed to improve query performance of the in-memory database at runtime.

21. The system of claim 18, wherein normalizing a column from the first dataset comprises creating a new dataset to store each distinct value from the column, removing the column from the first dataset, and creating a database relationship between the created dataset and the first dataset.

22. The system of claim 18, wherein a column is identified to normalize in order to reduce the storage requirements of a given dataset to fit within a logical or physical boundary of the parallel computer system.

23. The system of claim 22, wherein the physical boundary comprises a memory of a single compute node, and wherein the given dataset is identified to be normalized in order to fit within the memory.

24. The system of claim 22, wherein the logical boundary comprises a group of compute nodes sharing access to a common resource, and wherein the given dataset is identified to be normalized in order to fit within the group of compute nodes.

\* \* \* \* \*